Aug. 4, 1942.  C. MALINOWSKI  2,291,972
PUMPING MECHANISM
Filed May 14, 1940  5 Sheets-Sheet 1

INVENTOR
CHESTER MALINOWSKI
BY
ATTORNEYS

Aug. 4, 1942.   C. MALINOWSKI   2,291,972
PUMPING MECHANISM
Filed May 14, 1940   5 Sheets-Sheet 4

INVENTOR
CHESTER MALINOWSKI
BY
ATTORNEY

Patented Aug. 4, 1942

2,291,972

UNITED STATES PATENT OFFICE 2,291,972

PUMPING MECHANISM

Chester Malinowski, Los Angeles, Calif., assignor to Electrolift Corporation, Ltd., San Francisco, Calif., a corporation of California Application May 14, 1940, Serial No. 335,095

22 Claims. (Cl. 103—46)

This invention relates generally to fluid pumping devices, such as deep well pumps of the reciprocating type, the plungers of which are driven by a driving mechanism embodying clutches which are alternately engaged and disengaged to effect reciprocation of the driving mechanism, and hence reciprocation of the plungers to create the pumping action and elevate liquid in a well.

Such driving mechanisms for pumps can be of the character described and claimed in U. S. Patents Nos. 2,112,835 and 2,123,184, issued to Edward C. Ekstromer, on April 5, 1938, and July 12, 1938, respectively, and including jaw clutches alternately engaged and disengaged automatically to reverse the motion of a shuttle member which reciprocates the plunger, this functioning taking place with the hydraulic load of the column of liquid being pumped imposed on the clutches so as to resist the clutching and declutching movements thereof, with attending wear on the clutch teeth and other working parts of the driving mechanism.

The primary object of this invention is to provide means for removing the hydraulic load of the liquid being pumped, from the pump driving mechanism, during a change or reversal in the operation of such mechanism, which would otherwise be resisted or adversely affected by the load.

Another object of this invention is to provide means which, in its association with a pump and jaw clutch controlled reciprocable driving mechanism for the plunger of the pump, is operable to relieve the jaw clutches of the hydraulic load of the column of liquid being pumped, during that portion of the cycle of operation wherein reversal of motion is effected by the engagement of one clutch and the disengagement of the other, or vice versa, so that the clutching and declutching movements will be free and thus greatly facilitated, clashing of the clutch teeth obviated, and premature wear on the clutch teeth and other parts of the driving mechanism avoided.

Another object of the invention is to provide unloading means of the above described character which is also operable to re-apply the hydraulic load to the driving mechanism in a gradual manner so that the jaw clutches will be relieved of the excessive torque stress attending the sudden application of the full hydraulic load to the clutches following re-engagement thereof, whereby to prolong the life of the mechanism and insure reversal of the motion of the shuttle member without such jarring action as might cause premature structural damage or failure of the driving mechanism.

With these and other objects in view, the invention resides in the combinations, arrangements and functional relationships of elements as set forth in the following specification and particularly pointed out in the appended claims.

Referring specifically to the drawings and particularly to Figures 1 to 9, inclusive, the invention in its present embodiment is shown for the purpose of illustration associated with a pumping mechanism as disclosed in U. S. Patent No. 2,123,184 issued July 12, 1938, to Edward C. Ekstromer.

Figures 1, 2, 3:
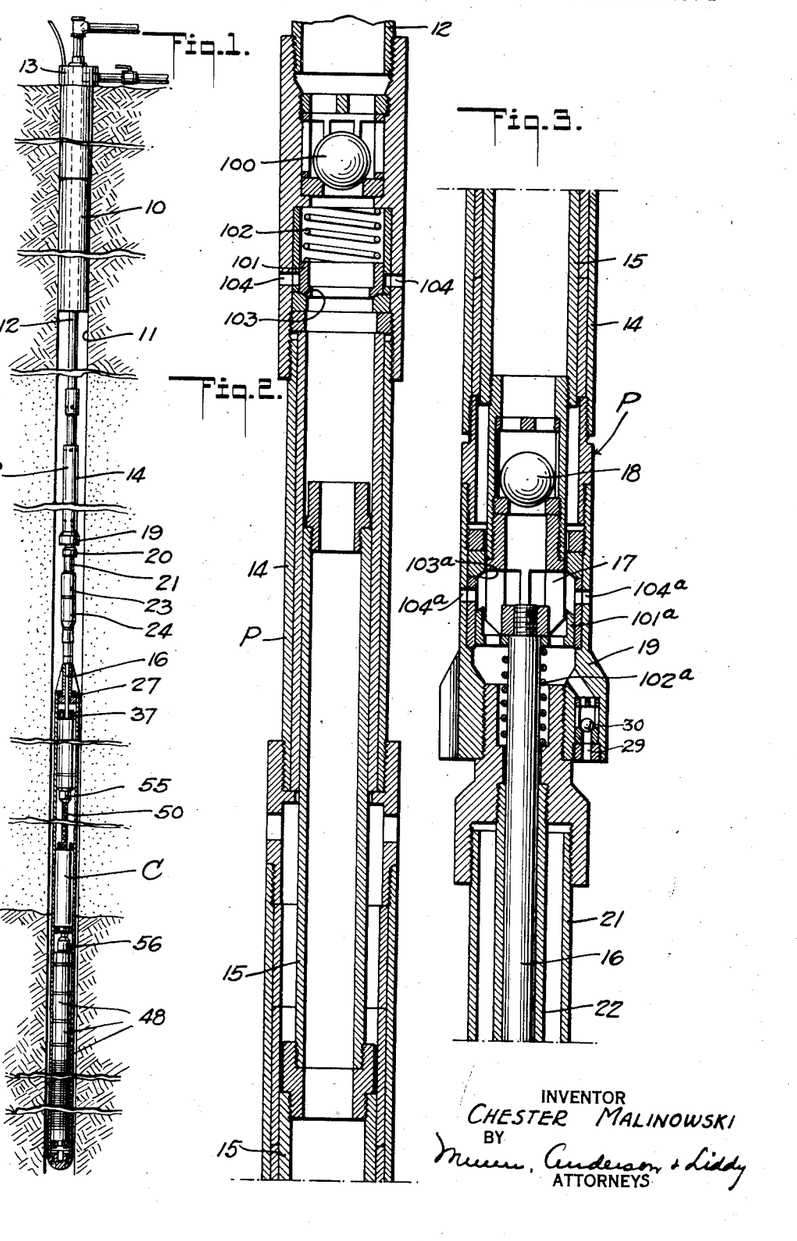
Figure 1 is a view showing the pumping mechanism embodying this invention installed in a well hole for pumping.
Figures 2, 3, 4, 5, 6 and 7 are vertical longitudinal sectional views of a portion of the pumping mechanism, which views are end to end continuations of each other in the numerical order of the figures, starting with the upper portion of the reciprocating pump in Figure 2 down to the lower end of the driving mechanism in Figure 7; and with Figures 4, 5, 6 and 7 at a larger scale than Figures 2 and 3.
Figure 4:
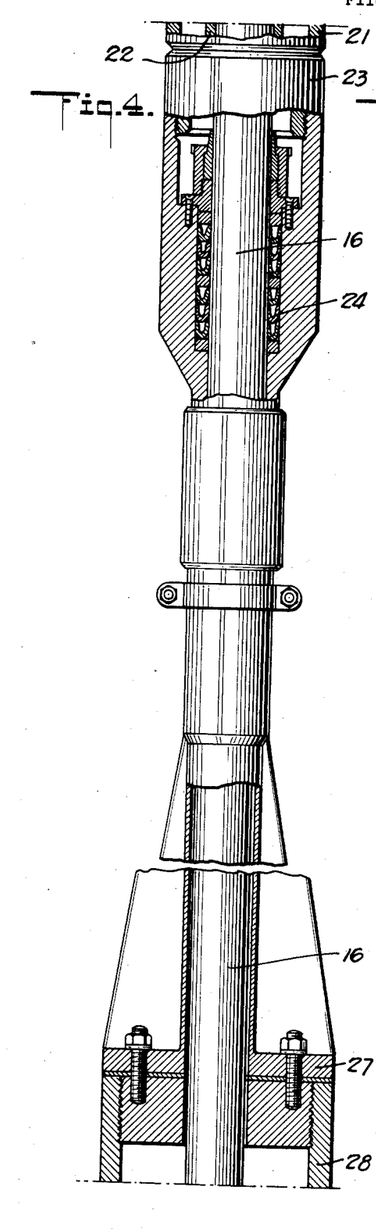

In Figure 1 this pumping mechanism is shown in a well casing 10 driven into the bore 11 of an oil well, and through which casing extends the usual tubing 12 constituting an oil discharge pipe and being suspended from the casing head 13 or other suitable support. At its lower end the tubing is connected to the barrel 14 of a reciprocating pump P which is illustrated as being of the double acting type and will be described later in detail.

Generally speaking, the pump P includes relatively reciprocating elements for effecting a pumping action, which elements are specifically in the form of a hollow plunger 15 reciprocable in the barrel 14 and connected to a depending plunger rod 16 by the cage 17 of the traveling valve 18 of the plunger. The plunger rod passes freely through the lower head 19 of the barrel 14 and through a collar 20 to which is secured a sleeve 21 containing a liner 22 (Figures 3 and 4) to provide a sealed joint between the two. The lower end of the sleeve 21 is secured by a collar 23 to a stuffing box 24, the plunger rod extending through the latter and through the top head 27 of a cylindrical housing 28 rigidly secured to the stuffing box. The head 19 is provided with several fluid intake passages 29 one of which is shown in Figure 3, each of these passages being controlled by an upwardly opening check valve 30.

At its lower end the plunger rod is connected to a crosshead 37 (Figures 5 and 9) reciprocably and non-rotatably mounted in the housing 28. By means of suitable connecting rods 46 (Figure 9), the crosshead is operatively connected to a driving mechanism C for converting rotary motion of electric motors 48 into reciprocating motion in order to reciprocate the plunger 15 of the pump P.

The driving mechanism C illustrated is identical in construction to that disclosed and claimed in U. S. Patent No. 2,123,184 issued July 12, 1938, to Edward C. Ekstromer. For the purpose of the present invention, it will suffice to state that the mechanism C comprises a shuttle member 49 to the upper end of which the connecting rods 46 are secured. The shuttle member is adapted to be reciprocated along a double threaded screw feed shaft 50 when the latter is driven continuously in one direction from the electric motors 48 through a suitable reduction gearing mechanism M.

Figure 5:
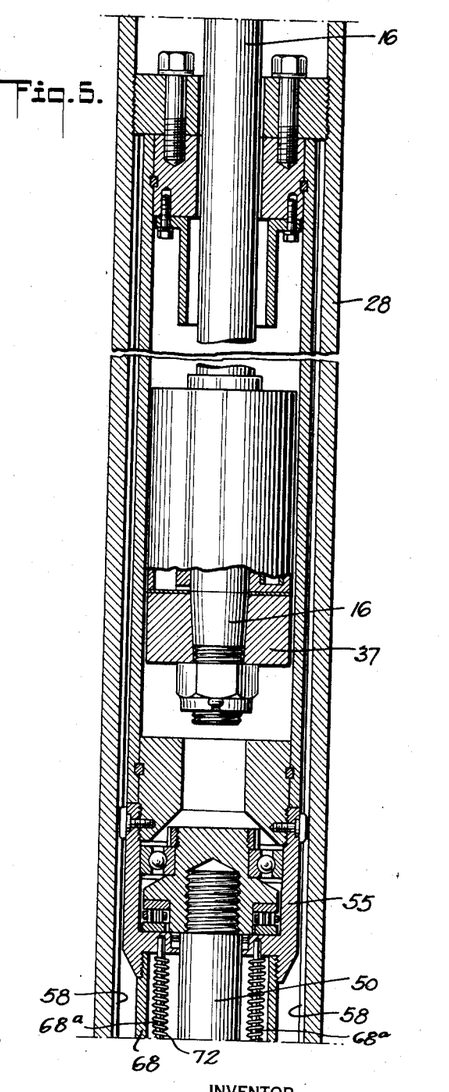
Figure 6:
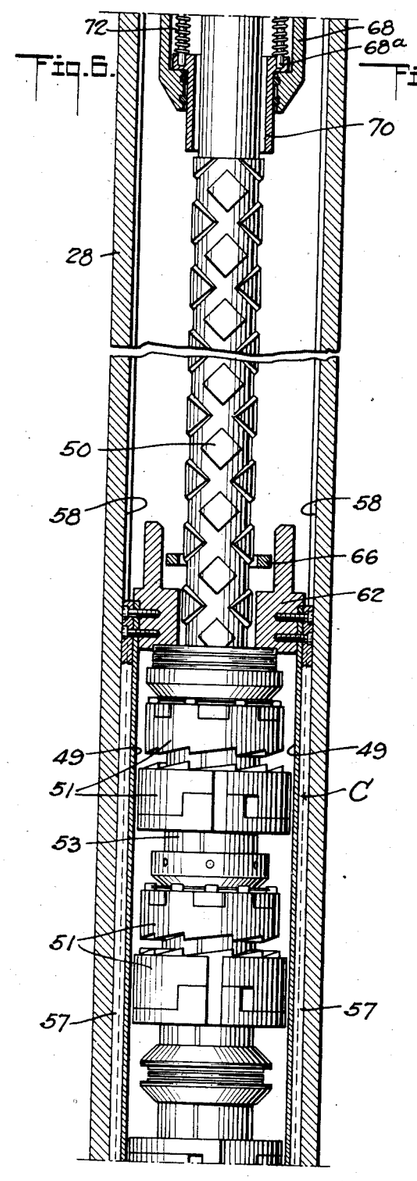
Figure 7:
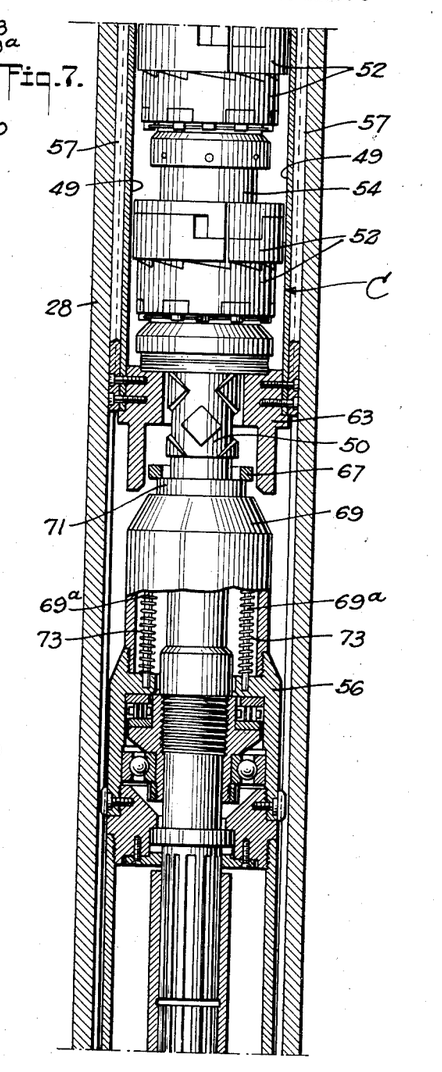
Figure 8:
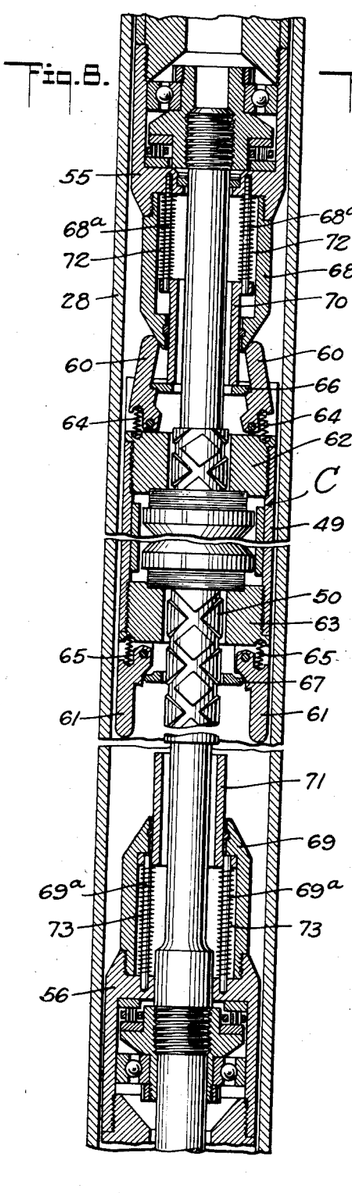
Figure 8 is a vertical longitudinal sectional view of the driving mechanism taken at a right angle to Figures 6 and 7 and with the intermediate portion of the driving mechanism broken away.
Figure 9:
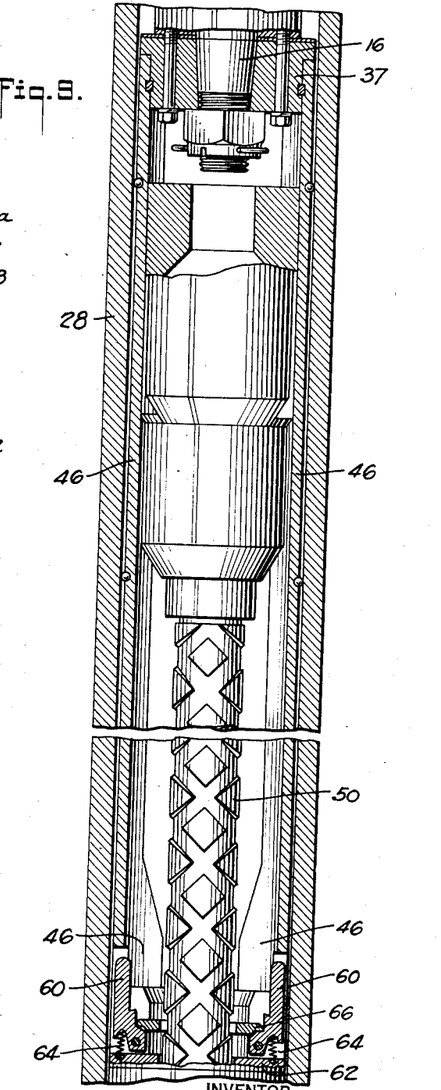
Figure 9 is a longitudinal sectional view of portions of the mechanism shown in Figures 5 and 6 and taken at a right angle to the latter figures.

Suitable control elements, which in the particular form of driving mechanism illustrated, comprise jaw clutches 51—51 and 52—52 (Figures 6 and 7) are caused to be alternately engaged and disengaged to render right and left hand nuts 53 and 54, respectively, alternately operable to feed the shuttle member between the upper and lower bearings 55 and 56 in which the upper and lower ends of the shaft are journaled as shown, respectively, in Figures 5 and 6 and Figure 8.

The shuttle member has fixed thereto at diametrically opposed locations, longitudinal keys 57 (Figures 5 and 6) which slide in longitudinal grooves 58 formed in the housing 28 so as to confine the shuttle member to movement axially in the housing.

As the mechanism for actuating the clutches to alternately engage and disengage them is not specifically a part of the present invention as claimed, it is not necessary that such mechanism be described in detail. However, by reference to Figure 8, it will be noted that dogs 60 and 61 are pivoted on top and bottom caps 62 and 63 of the shuttle member 49 and are normally urged by springs 64 and 65 to latching position for engagement with cross plates 66 and 67 which are part of an actuating assembly (not shown) operatively connecting movable jaws of the clutches for engagement of one clutch and disengagement of the other or vice versa.

The dogs 60 and 61 are adapted to be moved to released positions, according as the shuttle member 49 approaches one extreme position or another in the housing 28.

For this purpose conical collars 68 and 69 are fixed, respectively, to the boxes of the bearings 55 and 56 in the path of movement of the dogs. Sleeves 70 and 71 are slidably mounted in the collars 68 and 69 on rods 68a and 69a having springs 72 and 73 thereon for urging the respective sleeve to an advanced position for engagement and retraction against the action of the respective cross plate 66 or 67 as the shuttle member approaches the corresponding extreme position and before the respective latches are released. The spring 72 or 73, as the case may be, is thus placed under stress, and the energy thus stored in the springs is utilized upon release of the respective dog 60 or 61, to move the actuating assembly including the cross plates 66 and 67, and hence the movable jaws of the clutches 51 and 52 in order to reverse the engagement and disengagement of the clutches for the purpose of effecting reverse movement of the shuttle member.

It will be noted that the hydraulic load of the column of liquid being pumped by the plunger 15 is constantly imposed on the latter as same is being reciprocated by the shuttle member 49 in response to continuous rotation of the shaft 50 and alternate clutching and declutching movements of the clutches 51 and 52 rendering the nut 53 or 54 active to be advanced by the shaft 50. This hydraulic load constantly acts on the clutches 51 and 52 by offering resistance to the axial clutching and declutching movements thereof, and, to obviate this condition, an automatic unloading means is provided to relieve the clutches of this load during the clutching and declutching intervals in the cycle of operation.

In the present embodiment of the invention, this means is associated with the pump P to which reference will now be had in Figures 2 and 3.

The barrel 14 of the pump, which is made up of several tubular sections, is provided at its upper end with the usual standing valve 100 and is connected to the tubing 12. Below the standing valve 100 there is mounted in the upper end of the barrel for movement axially thereof an unloading valve 101 in the form of a ring normally urged by a spring 102 to one extreme position against an annular stop shoulder 103 in the barrel. In this position the valve closes ports 104 in the uppermost section of the barrel 14 which contains the standing valve 100.

At the lower end of the barrel below the cage 17 a similar valve 101a is mounted for movement axially thereof and is normally urged by a spring 102a to one extreme position against an annular stop shoulder 103a in the barrel. In this position the valve 101a closes ports 104a in the lower head 19 of the barrel. The upper unloading valve 101 is disposed in the path of upward movement of the plunger, whereas the lower unloading valve 101a is disposed in the path of downward movement of the plunger for actuation by the cage 17 thereof in a manner to be described in the operation of the invention, which is as follows:

With the shaft 50 being continuously driven by the motors 48 to effect reciprocation of the shuttle member 49 by engagement of one of the clutches 51 and 52 and disengagement of the other, or vice versa, so as to alternately cause the nuts 53 and 54 to be axially fed by the shaft, the plunger 15 will be reciprocated to cause the standing and traveling valves 100 and 18, respectively, to co-act with the check valve 30 in raising a column of liquid in the tubing 12.

Assuming that the plunger 15 is on its downstroke, the valve 101a, which is being maintained closed with respect to the ports 104a by the spring 102a, is struck and moved by the cage 17 of the traveling valve 18 as the plunger approaches its lowermost position. During this last portion of the downstroke of the plunger, which corresponds to the portion of the stroke of the shuttle member 49 during which one of the clutches 51 and 52 is being disengaged and the other clutch engaged, the valve 101a is moved sufficiently to open the ports 104a as shown in Figure 3, thus reducing the pressure in the barrel by permitting liquid therein to escape into the well through the ports 104a, whereby the superior pressure of the column of liquid above the standing valve 100 will close the latter. Thus during the interval in which clutching and declutching movements of the clutches are being effected on the downstroke of the plunger, the hydraulic load of the column of liquid is removed from the clutches so that engagement and disengagement thereof will be free and easy.

As the driving mechanism initiates movement of the plunger on the next upstroke, the spring 102a will restore the valve 101a to closed position, and it will be evident that as the ports 104a are relatively gradually closed, the hydraulic load of the liquid column will be gradually re-applied to the clutches which have been engaged, so that the clutches will be relieved of the excessive torque stress attending the sudden application of the full hydraulic load to the clutches.

As the plunger 15 approaches the end of its upstroke, the valve 101 is struck and moved by the upper end of the plunger to open position against the action of the spring 102, thus opening the ports 104 to reduce the pressure in the barrel by again permitting liquid therein to escape into the well through the ports 104, whereby the superior pressure of the column of liquid above the standing valve 100 will again close the latter. The hydraulic load of the column of liquid being pumped is thus relieved from the clutches 51 and 52 as the axial clutching and declutching movements thereof are being effected on the upstroke of the plunger so that engagement and disengagement of the clutches will be accomplished with freedom and ease.

As the driving mechanism initiates movement of the plunger on the next downstroke, the spring 102 will restore the valve 101 to closed position, and it will be clear that as the ports 104 will be closed relatively gradually, the hydraulic load will again be gradually re-applied to those clutches which have just been engaged so that the clutches will be relieved of the excessive torque stress of a full load.

Figures 10, 11, 12, 13, 14:
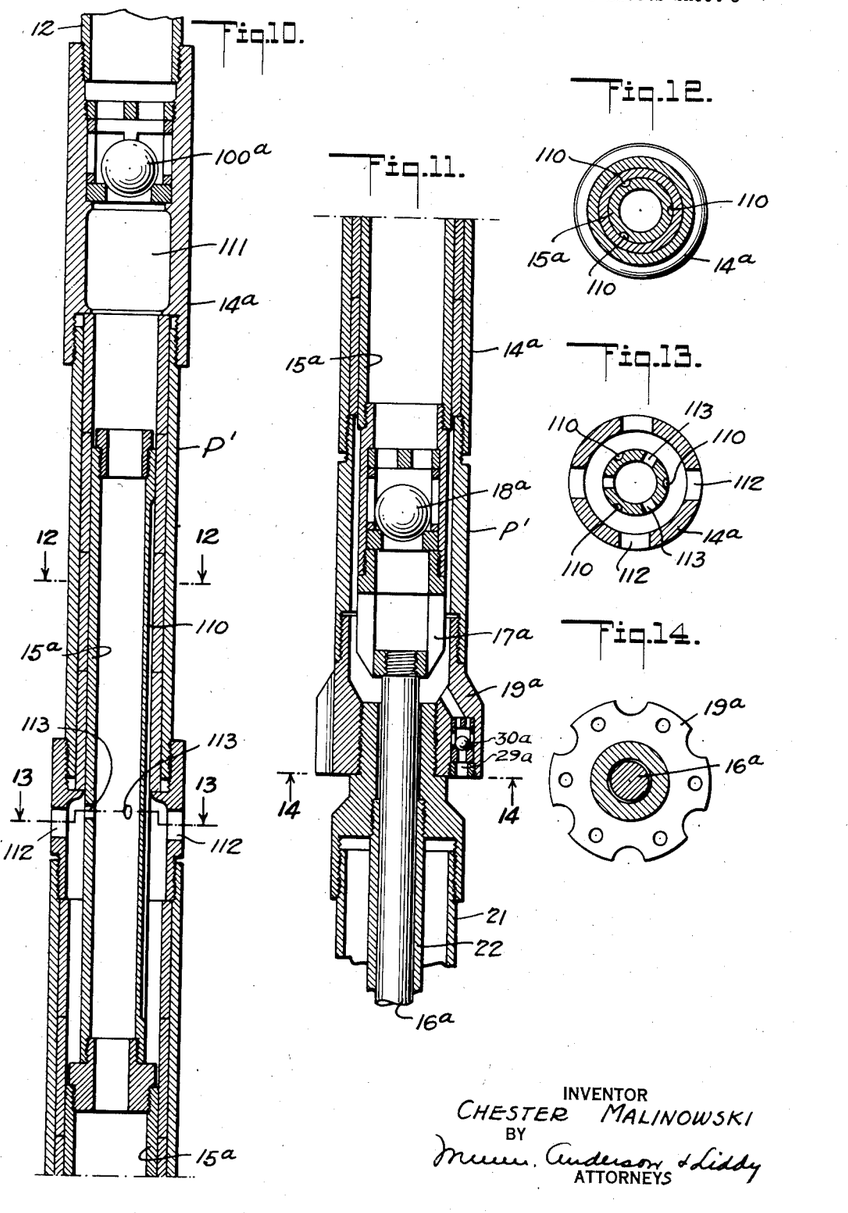
Figures 10 and 11 are vertical longitudinal sectional views similar to Figures 2 and 3, respectively, and illustrating a modified form of the invention.
Figures 12 and 13 are transverse sectional views taken, respectively, on the lines 12—12 and 13—13 of Figure 10.
Figure 14 is a transverse sectional view taken on the line 14—14 of Figure 11.

Reference will now be had to Figures 10 to 14, inclusive, which illustrate a second form of unloading means embodying this invention and incorporated in a double acting pump P' having a multi-section barrel 14a in which works a tubular plunger 15a connected to a plunger rod 16a by the cage 17a of a traveling valve 18a. The plunger rod 16a is understood to be connected to the driving mechanism C in the same manner as was the plunger 15 of the pump P. The head 19a is provided with several fluid intake passages 29a one of which is shown in Figure 11, each of these passages being controlled by an upwardly opening check valve 30a which co-acts with the traveling and standing valves 18a and 100a, respectively, in the manner described in the first form of the invention.

The periphery of the plunger 15a is provided with a plurality of longitudinal passages 110 equally spaced circumferentially and terminating in spaced relation to the ends of the plunger. The confronting annular surface of the wall of the barrel 14a renders these passages inactive except during that portion of the upstroke of the plunger during which clutching and declutching movements of the clutches 51 and 52 are being effected. As the plunger approaches the end of its upstroke, the upper ends of the passages 110 open into an enlarged portion 111 of the barrel 14a while the lower ends of the passages are in communication with breather ports 112 of the barrel, whereby to reduce fluid pressure in the barrel by permitting the escape of liquid therefrom through the ports 112 into the well. The superior pressure in the tubing 12 above the standing valve 100a now acts to close the latter so that the hydraulic load of the column of liquid being pumped is relieved from the clutches with the same advantages as aforestated.

The plunger 15a is also provided with a circular series of ports 113 which are closed by the confronting annular wall of the barrel during all of the movement of the plunger except that portion of the downstroke of the plunger in which clutching and declutching movements of the clutches 51 and 52 are being effected. As the plunger approaches the end of its downstroke, the ports 113 place the interior of the barrel in comunication with the breather ports 112 so as to again reduce the pressure in the barrel below the standing valve 100a and thus permit the superior pressure in the tubing 12 to close the standing valve. The hydraulic load of the column of liquid being pumped will thus be removed from the clutches 51 and 52 so that engagement and disengagement thereof can be effected with freedom.

The action of the passages 110 and ports 113 in gradually re-applying the hydraulic load to the clutches following reengagement thereof is the same as described in connection with the gradual closing of the ports 104 and 104a by the valves 101 and 101a, with the attending advantages above described.

It will be clear that the passages 110 and ports 113 co-act with the barrel in providing unloading valves which are broadly the functional equivalent of the valves 101 and 101a.

What is claimed is:

1. In combination: a well pump having relatively reciprocating elements for effecting the pumping action; driving mechanism for said pump comprising a shuttle operatively connected to the reciprocating element of the pump; a driving element; means including clutches for operatively connecting the driving element to the shuttle; means for respectively engaging and disengaging the clutches to reciprocate the shuttle with the clutches carrying the hydraulic load of the fluid being pumped; and means co-acting with the pump and driving mechanism to remove the hydraulic load of the fluid being pumped, from the clutches when being engaged and disengaged.

2. In combination: a well pump having relatively reciprocating elements for effecting the pumping action; driving mechanism for said pump comprising a shuttle operatively connected to the reciprocating element of the pump; a driving element; means including clutches for operatively connecting the driving element to the shuttle; means for respectively engaging and disengaging the clutches to reciprocate the shuttle with the clutches carrying the hydraulic load of the fluid being pumped; and means co-acting with the pump to relieve the latter of the hydraulic load of the fluid being pumped during the interval of clutching and declutching movements of said clutches, whereby the clutches will be free of the resistance imposed by the hydraulic load.

3. In combination: a well pump having relatively reciprocating elements for effecting the pumping action; a driving mechanism for said pump including a reciprocable member operatively connected to the reciprocating element of the pump; a driving element; a plurality of clutch means for operatively connecting the driving element to said member; means for respectively engaging and disengaging said clutch means to reciprocate said member, with the engaged clutch means carrying the hydraulic load of the fluid being pumped; and means synchronized with the movement of said member, for venting the pump of fluid pressure during the interval of clutching and declutching movements of the clutch means, to relieve the latter of the hydraulic load of the fluid being pumped.

4. In combination: a well pump having relatively reciprocating elements for effecting the pumping action; a driving mechanism for said pump including a reciprocable member operatively connected to the reciprocating element of the pump; a driving element; a plurality of clutch means for operatively connecting the driving element to said member; means for respectively engaging and disengaging said clutch means to reciprocate said member, with the engaged clutch means carrying the hydraulic load of the fluid being pumped; and means synchronized with the movement of said member, for venting the pump of fluid during the interval of clutching and declutching movements of the clutch means, to relieve the latter of the hydraulic load of the fluid being pumped, said means being operable to re-apply the hydraulic load relatively gradually to the clutch means following re-engagement thereof so as to obviate excessive stresses on the clutch means due to full loads suddenly applied thereto.

5. In combination, a well pump including a barrel, a plunger working therein, and standing and traveling valves co-acting with the barrel and plunger to effect the pumping of fluid in response to actuation of the plunger; a driving mechanism including a reciprocable member operatively connected to the plunger; a driving element; clutches for operatively connecting the driving element to said member; means for respectively engaging and disengaging said clutches to reciprocate said member, with the clutches carrying the hydraulic load of the fluid being pumped; and means correlated with the pump and driving mechanism to reduce the fluid pressure in the pump barrel during the interval of engagement and disengagement of said clutches, so as to permit the standing valve to close, whereby to remove the hydraulic load of the fluid being pumped, during the clutching and declutching operation.

6. In combination, a well pump including a barrel, a plunger working therein, and standing and traveling valves co-acting with the barrel and plunger to effect the pumping of fluid in response to actuation of the plunger; a driving mechanism including a reciprocable member operatively connected to the plunger; a driving element; clutches for operatively connecting the driving element to said member; means for respectively engaging and disengaging said clutches to reciprocate said member, with the clutches carrying the hydraulic load of the fluid being pumped; and means controlled by said plunger to vent the barrel of fluid pressure and permit the standing valve to close in such timed relationship to movement of the reciprocable member, that the clutches will be relieved of the hydraulic load of the fluid being pumped, during the clutch engaging and disengaging interval.

7. In combination: a well pump including a barrel, a plunger working therein, and standing and traveling valves co-acting with the barrel and plunger to effect the pumping of fluid in response to actuation of the plunger; a driving mechanism including a reciprocable member operatively connected to the plunger; a driving element; clutches for operatively connecting the driving element to said member; means for respectively engaging and disengaging said clutches to reciprocate said member, with the clutches carrying the hydraulic load of the fluid being pumped; and valves in the pump barrel operable by the plunger to vent the barrel of fluid pressure during such portions of the strokes of the plunger as correspond to the clutching and declutching intervals of the clutches in a cycle of operation of the pump, whereby to relieve the clutches of the hydraulic load of the fluid being pumped, by permitting superior pressure of fluid above the standing valve to close the latter.

8. In combination: a well pump including a barrel, a plunger working therein and standing and traveling valves co-acting with the barrel and plunger to effect the pumping of fluid in response to actuation of the plunger; a driving mechanism including a reciprocable member operatively connected to the plunger; a driving element; clutches for operatively connecting the driving element to said member; means for engaging one clutch and disengaging the other or vice versa to reciprocate said member, with the clutches carrying the hydraulic load of the fluid being pumped; and means co-acting with the pump and driving mechanism to render the standing valve free to close when the clutches are being engaged and disengaged, so as to relieve the clutches of the hydraulic load of a column of fluid above the standing valve.

9. In combination: a well pump including a barrel, a plunger working therein and standing and traveling valves co-acting with the barrel and plunger to effect the pumping of fluid in response to actuation of the plunger; a driving mechanism including a reciprocable member operatively connected to the plunger; a driving element; clutches for operatively connecting the driving element to said member; means for engaging one clutch and disengaging the other or vice versa to reciprocate said member, with the clutches carrying the hydraulic load of the fluid being pumped; and means co-acting with the pump and driving mechanism to render the standing valve free to close when the clutches are being engaged and disengaged, so as to relieve the clutches of the hydraulic load of a column of fluid above the standing valve, said means being operable to reapply the hydraulic load relatively gradually to the clutches following re-engagement thereof so as to obviate excessive stresses on the clutches by full loads suddenly applied.

10. In combination: a well pump having relatively reciprocating elements for effecting the pumping action; driving mechanism for said pump comprising a shuttle operatively connected to the reciprocating element of the pump; a driving element; means including clutches for operatively connecting the driving element to the shuttle; means for respectively engaging and disengaging the clutches to reciprocate the shuttle with the clutches carrying the hydraulic load of the fluid being pumped; and means for relieving the clutches of the hydraulic load of fluid being pumped during the interval that the clutches are being engaged and disengaged.

11. In well pumping apparatus including a pump having relatively reciprocating elements for effecting a pumping action, driving mechanism including a reciprocable member adapted for operative connection to the reciprocating element of the pump to drive same; a driving element; a plurality of clutch means for operatively connecting the driving element to said member; means for respectively engaging and disengaging said clutch means to reciprocate said member, with the engaged clutch means carrying the hydraulic load of the fluid being pumped; and means operatively associated with said member and clutch means to relieve the latter of the hydraulic load of liquid being pumped during the clutching and declutching intervals of both pumping strokes in the cycle of operation.

12. In well pumping apparatus including a pump having relatively reciprocating elements for effecting a pumping action, driving mechanism including a reciprocable member adapted for operative connection to the reciprocating element of the pump to drive same; a driving element; a plurality of clutch means for operatively connecting the driving element to said member; means for respectively engaging and disengaging said clutch means to reciprocate said member, with the engaged clutch means carrying the hydraulic load of the fluid being pumped; and means adapted for co-action with the pump, and synchronized with the motion of said member and clutch means to relieve the latter of the hydraulic load of the liquid being pumped, during the clutching and declutching interval in the cycle of operation.

13. In well pumping apparatus including a pump having relatively reciprocating elements for effecting a pumping action, driving mechanism including a reciprocable member adapted for operative connection to the reciprocating element of the pump to drive same; a driving element; a plurality of clutch means for operatively connecting the driving element to said member; means for respectively engaging and disengaging said clutch means to reciprocate said member, with the engaged clutch means carrying the hydraulic load of the fluid being pumped; means operatively associated with said member and clutch means to relieve the latter of the hydraulic load of liquid being pumped during the clutching and declutching interval in the cycle of operation, said means being operable to re-apply the hydraulic load relatively gradually to the clutch means following re-engagement thereof so as to obviate excessive stresses imposed on the clutch means by starting under a full load.

14. In well pumping apparatus including a pump having relatively reciprocating elements for effecting a pumping action, in combination, a driving mechanism including a reciprocable member for driving the reciprocating element of the pump; a driving element; a plurality of clutch means for operatively connecting the driving element to said member; means for respectively engaging and disengaging said clutch means to reciprocate said member, with the engaged clutch means carrying the hydraulic load of the fluid being pumped; and means for relieving the clutch means of the hydraulic load of liquid being pumped, during the intervals in which said clutch means are being engaged and disengaged.

15. In combination: a double acting well pump having relatively reciprocating elements for effecting the pumping action; driving mechanism for said pump comprising a shuttle operatively connected to the reciprocating element of the pump; a driving element; means including clutches for operatively connecting the driving element to the shuttle; means for respectively engaging and disengaging the clutches to reciprocate the shuttle with the clutches carrying the hydraulic load of the fluid being pumped; and means co-acting with the pump and driving mechanism to remove the hydraulic load of the fluid being pumped, from the clutches when the latter are being actuated during both strokes of the pump.

16. In well pumping apparatus including a pump having relatively reciprocating elements for effecting the pumping action; driving mechanism including a reciprocable member adapted for operative connection to the reciprocating element of the pump to drive same; a driving element; a plurality of clutch means for operatively connecting the driving element to said member; means for alternately engaging and disengaging said clutch means to reciprocate said member, with the clutch means carrying the hydraulic load of the fluid; and means operatively associated with said member and clutch means to relieve the latter of the hydraulic load of fluid when the clutch means are being actuated during both strokes of the pump.

17. The combination, with a well pump including a barrel, a plunger working therein, and standing and traveling valves co-acting with the barrel and plunger to effect the pumping of fluid in response to actuation of the plunger; of driving mechanism including a reciprocable member operatively connected to the pump plunger, and means for reciprocating said member; and means correlated with the pump and driving mechanism to sufficiently reduce the fluid pressure in the barrel during the latter portion of the pumping strokes of the plunger, that the standing valve will be permitted to close, whereby to remove the hydraulic load of the fluid being pumped, from the pump during such portion of the plunger's movement.

18. The combination, with a well pump including a barrel, a plunger working therein, and standing and traveling valves co-acting with the barrel and plunger to effect the pumping of fluid in response to actuation of the plunger, of driving mechanism including a reciprocable member operatively connected to the pump plunger, and means for reciprocating said member; and means synchronized with the movement of the pump plunger, for venting the pump of fluid pressure as the plunger approaches the end of each pumping stroke, whereby to relieve the pump of the hydraulic load of the fluid being pumped, during such portion of the plunger's movement.

19. In well pumping apparatus including a pump having relatively reciprocating elements for effecting the pumping action, driving mechanism including a reciprocable member adapted for operative connection to the reciprocating element of the pump to drive same; a driving element; means including a plurality of control elements normally subjected to the hydraulic load of the fluid being pumped and alternately active to operatively associate the driving element with said member to effect reciprocation of the latter; and means synchronized with the motion of said member, for relieving the driving mechanism of the hydraulic load of the fluid being pumped, during the interval in the cycle of operation in which the activeness of the control elements is changing from one element to the other.

20. The combination, with a reciprocating type of well pump, of a reciprocable member operatively connected to the reciprocating element of the pump to drive the latter; means for reciprocating said member; and means operable in synchronism with said member to remove the hydraulic load of the fluid being pumped, from the pump during the portion of each pumping stroke in which the motion of the reciprocating element of the pump is being reversed.

21. Well pumping apparatus comprising: a prime mover; a pump of the type having relatively reciprocating elements for effecting a pumping action; power transmitting mechanism operatively connecting the prime mover and reciprocating element of the pump and subjected to the hydraulic load of the fluid being pumped; and means for removing the hydraulic load of the fluid from said mechanism during the interval in the cycle of operation in which the reciprocating motion of the reciprocating element of the pump is being reversed.

22. Well pumping apparatus comprising: a prime mover; a pump of the type having relatively reciprocating elements for effecting a pumping action; power transmitting mechanism operatively connecting the prime mover and reciprocating element of the pump and subjected to the hydraulic load of fluid being pumped; and means synchronized with the movement of the pump, to vent the latter of fluid pressure during the interval in the cycle of operation in which the motion of the reciprocating element of the pump is being reversed, whereby to remove the hydraulic load of the fluid from said mechanism during said interval.

CHESTER MALINOWSKI.